United States Patent
Kaliski, Jr. et al.

(10) Patent No.: US 11,329,821 B2
(45) Date of Patent: May 10, 2022

(54) SHARED REGISTRATION SYSTEM

(71) Applicant: VERISIGN, INC., Reston, VA (US)

(72) Inventors: Burton S. Kaliski, Jr., McLean, VA (US); Scott Hollenbeck, Fairfax Station, VA (US)

(73) Assignee: VeriSign, Inc., Reston, VA (US)

(*) Notice: Subject to any disclaimer, the term of this patent is extended or adjusted under 35 U.S.C. 154(b) by 750 days.

(21) Appl. No.: 14/980,158

(22) Filed: Dec. 28, 2015

(65) Prior Publication Data

US 2017/0187673 A1    Jun. 29, 2017

(51) Int. Cl.

| | | |
|---|---|---|
| *G06F 21/33* | (2013.01) | |
| *H04L 9/32* | (2006.01) | |
| *H04L 29/12* | (2006.01) | |
| *H04L 29/06* | (2006.01) | |
| *H04L 61/4511* | (2022.01) | |
| *H04L 61/3015* | (2022.01) | |

(52) U.S. Cl.
CPC .......... *H04L 9/3213* (2013.01); *G06F 21/33* (2013.01); *G06F 21/335* (2013.01); *H04L 9/321* (2013.01); *H04L 61/1511* (2013.01); *H04L 61/302* (2013.01); *H04L 63/0807* (2013.01)

(58) Field of Classification Search
CPC ..... H04L 61/00; H04L 61/15; H04L 61/1505; H04L 61/1511; H04L 61/30; H04L 61/3015; H04L 61/302; H04L 63/00; H04L 63/08; H04L 63/0807; H04L 63/0823; H04L 63/0884; H04L 63/10; H04L 9/00; H04L 9/006; H04L 9/08; H04L 9/32; H04L 9/321; H04L 9/3213; G06F 21/00; G06F 21/30; G06F 21/31; G06F 21/33; G06F 21/335; G06F 21/44; G06F 21/60; G06F 21/62; G06F 15/00; G06F 15/16
See application file for complete search history.

(56) References Cited

U.S. PATENT DOCUMENTS

| | | | | |
|---|---|---|---|---|
| 6,052,733 A | * | 4/2000 | Mahalingam | G06F 1/20 709/223 |
| 6,119,234 A | * | 9/2000 | Aziz | H04L 29/06 726/11 |
| 6,961,783 B1 | * | 11/2005 | Cook | H04L 29/12066 709/223 |

(Continued)

FOREIGN PATENT DOCUMENTS

WO    2012/091974 A1    7/2012

OTHER PUBLICATIONS

Fisher—A Beginner's Guide to Domain Name Management—Feb. 2014.*

(Continued)

*Primary Examiner* — Boris D Grijalva LoBos
(74) *Attorney, Agent, or Firm* — Baker Botts L.L.P.; Michael A. Sartori

(57) ABSTRACT

Systems and methods for updating a Domain Name System (DNS) registry are disclosed. Embodiments perform operations including maintaining a domain name record of a DNS registrant recorded in a database of the DNS registry by a primary DNS interface. The operations also include receiving a request to update the domain name record of the DNS registrant via a secondary DNS interface. The operations further include modifying the domain name record of the DNS registrant in the DNS database in accordance with the request.

17 Claims, 7 Drawing Sheets

(56) References Cited

U.S. PATENT DOCUMENTS

| | | | | |
|---|---|---|---|---|
| 7,644,117 | B2* | 1/2010 | Zimmerman | G06Q 30/02 709/200 |
| 7,987,251 | B2* | 7/2011 | Blinn | H04L 29/12066 709/223 |
| 7,996,457 | B2* | 8/2011 | Parsons | H04L 61/3015 709/202 |
| 8,073,783 | B2* | 12/2011 | Felsted | G06F 21/41 705/39 |
| 8,402,508 | B2* | 3/2013 | Rouskov | G06F 21/335 726/2 |
| 8,571,990 | B2* | 10/2013 | Buss | G06Q 10/10 705/50 |
| 8,745,718 | B1* | 6/2014 | Dufel | H04L 63/0807 713/155 |
| 8,904,519 | B2 | 12/2014 | Essawi et al. | |
| 8,949,982 | B2* | 2/2015 | Gould | H04L 63/1441 726/22 |
| 9,106,712 | B1* | 8/2015 | Gardos | H04L 63/08 |
| 9,130,926 | B2* | 9/2015 | Nori | H04L 63/0807 |
| 9,137,094 | B1* | 9/2015 | Sayed | H04L 61/1511 |
| 9,485,213 | B2* | 11/2016 | Schilling | H04L 61/302 |
| 9,684,918 | B2* | 6/2017 | Kamdar | G06Q 30/0621 |
| 9,807,053 | B1 | 10/2017 | Schilling et al. | |
| 10,015,134 | B2* | 7/2018 | Gould | H04L 61/302 |
| 10,476,836 | B1* | 11/2019 | Saleem | H04L 61/2007 |
| 2002/0059146 | A1* | 5/2002 | Keech | G06Q 20/02 705/64 |
| 2002/0152400 | A1 | 10/2002 | Zhang et al. | |
| 2003/0140223 | A1* | 7/2003 | Desideri | H04L 63/0272 713/153 |
| 2004/0167982 | A1* | 8/2004 | Cohen | H04L 29/12066 709/226 |
| 2004/0249961 | A1 | 12/2004 | Katsube et al. | |
| 2005/0021965 | A1 | 1/2005 | Van Horn | |
| 2005/0102354 | A1* | 5/2005 | Hollenbeck | G06Q 30/06 709/203 |
| 2006/0031330 | A1* | 2/2006 | Ruiz | G06O 30/0217 709/206 |
| 2007/0208869 | A1* | 9/2007 | Adelman | G06Q 10/107 709/229 |
| 2009/0300355 | A1* | 12/2009 | Crane | G06F 21/33 713/168 |
| 2010/0049790 | A1* | 2/2010 | Schreiber | G06F 9/454 709/203 |
| 2010/0325723 | A1 | 12/2010 | Essawi et al. | |
| 2011/0225637 | A1* | 9/2011 | Counterman | G06F 21/6245 726/7 |
| 2011/0276485 | A1* | 11/2011 | Varga | G06Q 20/10 705/44 |
| 2012/0136936 | A1* | 5/2012 | Quintuna | G06F 21/604 709/204 |
| 2012/0174198 | A1* | 7/2012 | Gould | H04L 63/0807 726/6 |
| 2012/0260322 | A1* | 10/2012 | Logan | G06F 21/33 726/6 |
| 2012/0314856 | A1 | 12/2012 | Zaverucha et al. | |
| 2013/0080341 | A1 | 3/2013 | Veeramachaneni et al. | |
| 2013/0104202 | A1* | 4/2013 | Yin | G06F 21/42 726/5 |
| 2013/0191884 | A1* | 7/2013 | Leicher | H04L 63/08 726/4 |
| 2014/0013396 | A1* | 1/2014 | Field-Eliot | H04L 63/0807 726/4 |
| 2014/0075513 | A1* | 3/2014 | Trammel | H04L 9/3213 726/4 |
| 2014/0189834 | A1* | 7/2014 | Metke | H04W 12/06 726/7 |
| 2014/0337914 | A1* | 11/2014 | Canning | H04L 63/10 726/1 |
| 2015/0058960 | A1 | 2/2015 | Schmoyer et al. | |
| 2015/0295905 | A1* | 10/2015 | Leicher | H04W 12/06 726/4 |
| 2015/0295916 | A1* | 10/2015 | Sanso | H04L 63/0807 726/9 |
| 2015/0312257 | A1* | 10/2015 | Antipa | H04L 63/10 709/225 |
| 2016/0057100 | A1 | 2/2016 | Blinn et al. | |
| 2016/0134599 | A1* | 5/2016 | Ross | H04L 63/08 713/168 |
| 2016/0269396 | A1* | 9/2016 | Ren | H04W 12/06 |
| 2017/0006021 | A1* | 1/2017 | Karaatanassov | H04L 63/0815 |
| 2017/0070595 | A1 | 3/2017 | Gould et al. | |
| 2017/0279617 | A1 | 9/2017 | Blinn et al. | |
| 2017/0279762 | A1 | 9/2017 | Fregly | |
| 2018/0062856 | A1 | 3/2018 | Kaliski, Jr. et al. | |
| 2018/0063141 | A1 | 3/2018 | Kaliski, Jr. et al. | |
| 2018/0351943 | A1* | 12/2018 | Yasukawa | H04L 63/0807 |
| 2020/0153938 | A1 | 5/2020 | Gould et al. | |

OTHER PUBLICATIONS

How to Manage DNS through your Domain Registrar—Applied Innovations—Mar. 2015.*

Nat—Dummy's guide for the Difference between OAuth Authentication and OpenID—May 15, 2011.*

OAuth 2 vs OpenID Connect to secure API—Information Security Stack Exchang—Jul. 2015.* dnsmadeeasy.com (Authoritative vs Recursive DNS Servers What's The Difference—Jul. 17, 2013).*

Google (About registrars and registries—Google Domains Help—Sep. 2015).*

Mr. DNS (What Is TLD Name Server—2009).*

M. Hunt, "Systems for Managing a Shared Domain Registry", Sep. 29, 2010, Retrieved from the Internet on Jan. 23, 2017: https://docs.nzrs.net.nz/_downloads/draft-nzrs-srs-03.pdf, pp. 1-169.

Extended European Search Report dated Jan. 31, 2017, European Application No. 16186666.0, pp. 1-8.

Extended European Search Report dated May 4, 2017, European Application No. 16206770.6, pp. 1-6.

PTO Non-Final Office Action dated Nov. 16, 2017, U.S. Appl. No. 14/844,703, pp. 1-49.

Mark Jeftovic, "Nameserver Operators Need the Ability to "Disavow" Domains", CircleID Internet Infrastructure, Dec. 2, 2014, Retrieved from the Internet: http://www.circleid.com/posts/20141202_nameserver_operators_need_the_ability_to_disavow_domains/, pp. 1-5.

Godaddy, "Cashparking", Retrieved from the internet on Feb. 19, 2016: https://www.godaddy.com/domains/cashparking, pp. 1-5.

Certified-Domains, "The Internet Hotspot for Domains, Email, Web Hosting, Certified Domains, and More!", Retrieved from the Internet on Feb. 19, 2016: http://www.certified-domains.com/Certified-Domains.html, p. 1.

Extended European Search Report dated Dec. 15, 2017, European Application No. 17188586.6, pp. 1-8.

Extended European Search Report dated Dec. 15, 2017, European Application No. 17188591.6, pp. 1-8.

PTO Non-Final Office Action dated Apr. 2, 2018, U.S. Appl. No. 15/251,497, pp. 1-50.

PTO Non-Final Office Action dated Mar. 22, 2018, U.S. Appl. No. 15/251,716, pp. 1-47.

European Office Action issued in corresponding European Patent Application No. 162067706, dated Jan. 28, 2919, pp. 1-5.

Kumari et al., "Automating DNSSEC Delegation Trust Maintenance", Internet Engineering Task Force (IETF), Request for Comments: 7344, dated Sep. 2014 (located at https://tools.iett.org/html/rfc7344), 19 pages.

Final Office Action issued in corresponding U.S. Appl. No. 15/251,497 dated Sep. 6, 2019, pp. 1-21.

Hunt, M., "System for Managing a Shared Domain Registry draft-nzrs-srs-02", New Zealand Registry Services, Jul. 26, 2010, pp. 1-162.

Non-Final Office Action issued in corresponding U.S. Appl. No. 15/251,716 dated Nov. 4, 2019, pp. 1-21.

(56) References Cited

OTHER PUBLICATIONS

Hardaker, W., "Child-to-Parent Synchronization in DNS", Internet Engineering Task Force (IETF), Request for Comments: 7477, dated Mar. 2015 (located at https://tools.ietf.org/html/rfc7477), 16 pages.
U.S. Office Action issued in corresponding U.S. Appl. No. 15/251,497 dated Mar. 10, 2020, 19 pages.
U.S. Office Action issued in corresponding U.S. Appl. No. 15/251,716 dated Apr. 29, 2020, 24 pages.
Bruce Schneier, Applied Cryptography, Protocols, Algorithms, and Source Code in C, 1996, 8.12 Public-Key Key Management, pp. 185-187 (6 pages).
Afred J. Menezes et al., Handbook of Applied Cryptography, 1997, 1.6 Digital Signatures, pp. 22-23 (6 pages).
U.S. Office Action issued in corresponding U.S. Appl. No. 15/251,497 dated Sep. 25, 2020, 23 pages.
Icann, Unsponsored TLD Agreement—Appendix C (.pro), dated Sep. 30, 2004 (20 pages).
Tseng, Leon Y., Final Office Action dated Apr. 5, 2019, U.S. Appl. No. 14/844,703, 25 pages.
Tseng, Leon Y., Non-Final Office Action dated Nov. 16, 2017, U.S. Appl. No. 14/844,703, 49 pages.
TSeng, Leon Y., Final Office Action dated May 24, 2018, U.S. Appl. No. 14/844,703, 34 pages.
Tseng, Leon Y., Non-Final Office Action dated Nov. 5, 2018, U.S. Appl. No. 14/844,703, 19 pages.
Tseng, Leon Y., Notice of Allowance dated Sep. 10, 2019, U.S. Appl. No. 14/844,703, 49 pages.
Tseng, Leon Y., Corrected Notice of Allowability dated Sep. 27, 2019, U.S. Appl. No. 14/844,703, 14 pages.
Tseng, Leon Y., Corrected Notice of Allowability dated Dec. 16, 2019, U.S. Appl. No. 14/844,703, 15 pages.
Tseng, Leon, Y., Final Office Action dated Mar. 16, 2021, U.S. Appl. No. 16/746,483, 21 pages.s
Ahsan, Syed M., Final Office Action dated Nov. 21, 2018, U.S. Appl. No. 15/251,497, 24 pages.
Ahsan, Syed M., Final Office Action dated Mar. 27, 2019, U.S. Appl. No. 15/251,497, 19 pages.
Ahsan, Syed M., Final Office Action dated Feb. 11, 2021, U.S. Appl. No. 15/251,497, 19 pages.
Ahsan, Syed M., Final Office Action dated Oct. 16, 2018, U.S. Appl. No. 115/251,716, 28 pages.
Ahsan, Syed M., Non-Final Office Action dated Dec. 18, 2020, U.S. Appl. No. 15/251,716, 20 pages.
Final Office Action issued in U.S. Appl. No. 15/251,716 dated Jun. 16, 2021, 34 pages.
European Office Action issued in European Application No. 16186666.0 dated Apr. 9, 2019, 5 pages.
Notice of Allowance issued in U.S. Appl. No. 16/746,483 dated Jun. 8, 2021, 12 pages.
Office Action issued in U.S. Appl. No. 17/227,660 dated Sep. 20, 2021, 78 pages.
OAuth Core 1., https://oauth.net/core/1.0/, Dec. 4, 2007 [retrieved on Sep. 15, 2021], 14 pages.
Office Action issued in U.S.A ppl. No. 15/251,497 dated Oct. 5, 2021, 33 pages.

\* cited by examiner

SHARED REGISTRATION SYSTEM

BACKGROUND

The domain name system (DNS) allows a person to visit a website by typing into a Internet browser application a "domain name" that is a familiar word or group of words, rather than the numeric internet protocol (IP) address of the computer on which the website resides. For example, a person desiring to visit a website could do so by entering in their web browser the domain name "example.com" instead of an IP address, such as "10.10.1.100." Although, the user could enter either the domain name or the IP address, the moniker "example.com" is easier to remember than a string of digits.

Domain name registration is the process by which a DNS registrant can reserve or lease the use of a domain name for a specified period of time from the date of registration. The domain name registration system consists of various top level domains (TLDs), such as the traditional .com, .net, .org, .edu, and .gov, as well as the newer .biz, .info, .name, .online, .xyz, .global, etc. A DNS registrant reserves a domain name through a DNS registrar. The DNS registrant is an entity, such as an individual, a business, an organization, or the like. The DNS registrar is an entity having business relationships with a DNS registry that controls the domain names for a particular TLD. The DNS registrar provides an interface to the DNS registrant to reserve a particular domain name (e.g., example.com) from the DNS registry.

The DNS registry manages and maintains a DNS registry database, which stores numerous, reserved domain names in association with identifiers of their respective DNS registrants and other information. The DNS registrar can access the DNS registry database to identify registered and available names for a particular TLD using the Extensible Provisioning Protocol (EPP). The DNS registrar can use this information to make reservations and check the state of domain names using the EPP.

In an example of the domain name registration process, a DNS registrant may wish to reserve the domain name "example.com." To do so, the DNS registrant contacts a DNS registrar that has established a business relationship with the DNS registry that operates the .com TLD. The DNS registrant queries the DNS registrar as to the availability of the domain name "example" in the .com namespace. The DNS registrar in turn would query the proper DNS registry through using the EPP, and then return the results to the DNS registrant. If the requested domain name is not registered to another entity, the DNS registrant may then obtain a registration of the domain name by paying a registration fee and providing information required by the DNS registry and DNS registrar. The DNS registry charges the DNS registrar for the domain name registration and the DNS registrar collects the registration fee from the DNS registrant.

The DNS registry database stores a predefined set of information associated with each registered domain name to ensure proper identification, security, and operability associated with the domain name. For example, all DNS registrants are required to make available to the DNS registry current administrative contact information. Also, in order for a domain name to work correctly, the DNS registry must maintain name server information for the domain to load into its TLD DNS system to refer outside DNS requests to the proper authoritative DNS servers. Also, to prevent accidental changes to the domain name settings, certain status codes are recorded that provide various levels of protection on the domain name.

A DNS registrant may use a service provider to manage services associated with their domain name. For example, DNS registrants may engage a service provider to perform DNS resolution services or digital certificate services. However, service providers are entities separate from and independent of DNS registrars that may lack any relationship with the DNS registry. As DNS registrars are the only clients of the DNS registry who are authorized to perform certain actions, such as modifying information stored in the DNS registry, service providers can only perform a limited set of services that do not require passing information through a DNS registrar.

Certain administrative tasks (e.g., changing name servers, publication of DNSSEC signer info) related to the DNS registry do not require the DNS registrar. However, as service providers have no client relationship with the DNS registry, a service provider cannot provide such administrative services to a DNS registrant unless the DNS registrar provides an interface for doing so. Therefore, it may be impossible for service providers to provide services that DNS registrants depend on.

SUMMARY

The present disclosure is generally directed to the DNS and, more specifically, to systems, methods, and computer-readable storage devices for maintaining the DNS.

Embodiments of the present disclosure provide a method for updating a DNS registry. The method includes maintaining a domain name record of a DNS registrant recorded in a database of the DNS registry by a primary DNS interface. The method also includes receiving a request to update the domain name record of the DNS registrant via a secondary DNS interface. The method further includes modifying the domain name record of the DNS registrant in the DNS database in accordance with the request.

The method may include verifying, by the secondary DNS interface, the authorization token of the DNS registrant prior to modifying the domain name record of the DNS registrant. The verifying the authorization token of the DNS registrant may include verifying the authorization token with a standalone identity service. The verifying the authorization token of the DNS registrant may include verifying the authorization token with public key of the registrant corresponding to a private key that was used to generate the authorization token for the registrant.

Additionally, embodiments of the present disclosure provide a method including receiving, by primary interface service, from a DNS registrar, a domain name of a DNS registrant. The method also includes receiving, by a secondary DNS interface service, from a service provider, an authorization token of the DNS registrant and a request to update information associated with the domain name of the DNS registrant. The method further includes verifying the authorization token using an identity service. The method further includes modifying information associated with the domain name of the DNS registrant in accordance with the request.

Moreover, embodiments of the present disclosure provide a system for updating a DNS registry. The system includes a DNS registry database, a primary DNS interface, and a secondary DNS interface. The system also includes a processor, a data storage device, and program instructions stored on the data storage device that, when executed by the processor, cause the system to perform operations including maintaining a domain name record of a DNS registrant recorded in the DNS registry database by a DNS registrar using the primary DNS interface. The operations further include receiving a request to update the domain name record of the DNS registrant via the secondary DNS interface. The operations further include modifying the domain name record of the DNS registrant in the DNS registry database in accordance with the request.

DRAWINGS

The present invention will become more fully understood from the detailed description and the accompanying drawings, wherein.

DETAILED DESCRIPTION

The present disclosure is generally directed to the DNS and, more specifically, to systems, methods, and computer-readable storage devices for maintaining the DNS. Embodiments disclosed herein provide a separate, secure interface to DNS registries for DNS registrants and/or the service providers that do not require access to the DNS registry through a DNS registrar, while preserving the existing DNS interface between registrants, registrars, and DNS registries. Systems and methods in accordance with aspects of the present disclosure ensure security of the DNS registry by identifying, authenticating, and authorizing all of the involved entities (i.e., DNS registrants, service providers, and DNS registrars) and/or their requests for services. For example, some implementations can identify and authenticate an entity before access it is granted to services of the DNS registry. Other implementations, can verify that requests from the entities are authorized. For example, an entity client may rely on an authorization on behalf of another entity, and may not need to be authenticated. Additionally, embodiments disclosed herein allow clients who do not have a direct business relationship with the registry operator to access registry services.

Figure 1:
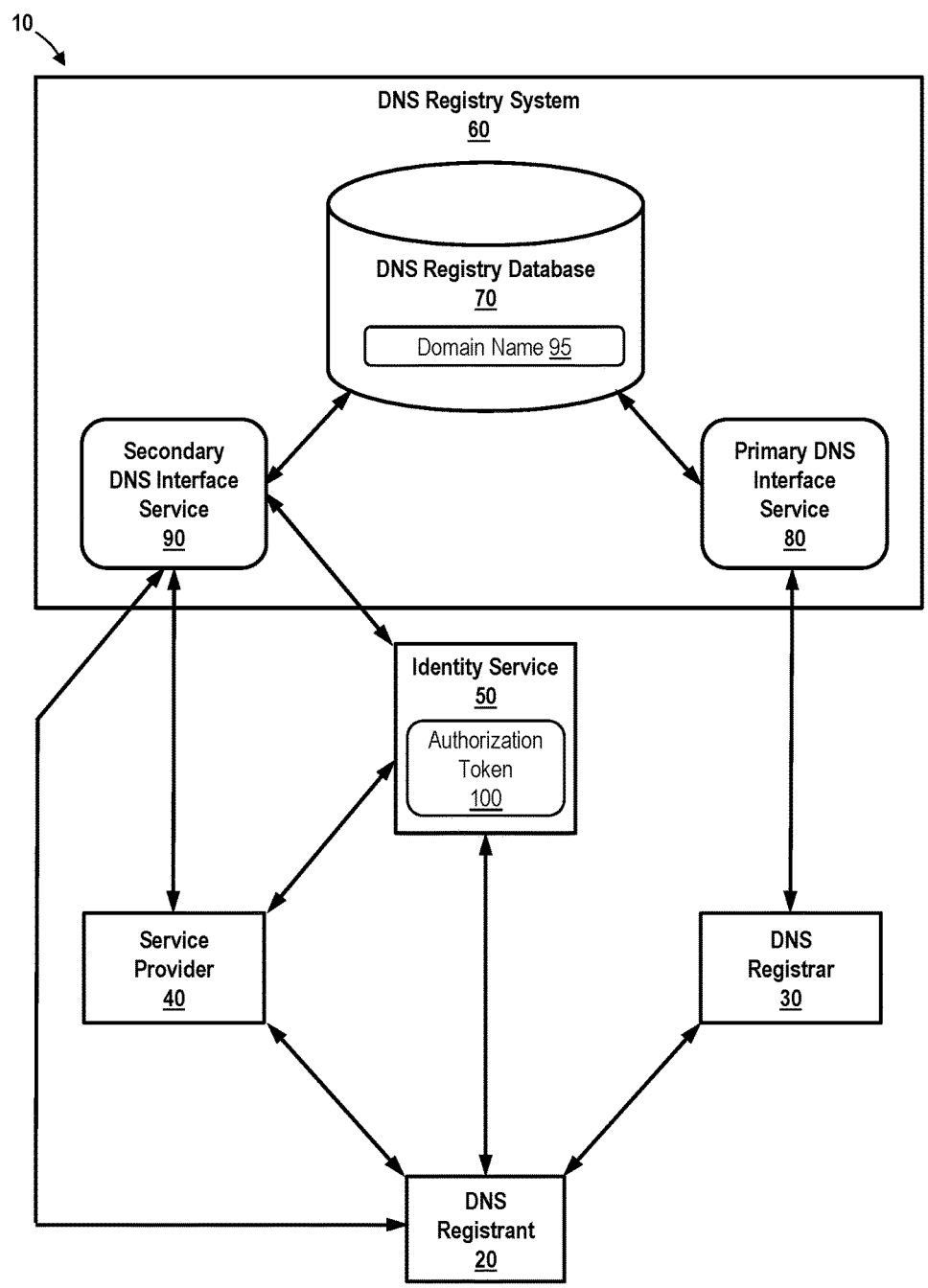
FIG. 1 illustrates a block diagram of an example of an environment for implementing systems and processes in accordance with aspects of the present disclosure.

FIG. 1 illustrates a block diagram of an example of an environment 10 for implementing systems and methods in accordance with aspects of the present disclosure. The environment 10 can include a DNS registrant 20, a DNS registrar 30, a service provider 40, an identity service 50, and a DNS registry system 60, which can exchange information via one or more networks (e.g., the Internet) and/or communication protocols (e.g., Transmission Control Protocol/Internet Protocol (TCP/IP), Extensible Provisioning Protocol (EPP) and (e.g., Registration Data Access Protocol (RDAP)). Further, the DNS registry system 60 can include a DNS registry database 70, a primary DNS interface service 80, and a secondary DNS interface service 90.

The DNS registrant 20, the DNS registrar 30, the service provider 40, and the DNS registry system 60 can be the same or similar to those previously described herein. For example, in accordance with the domain name registration process, the DNS registrant 20 can use the DNS registrar 30 to register and manage domain names in the DNS registry system 60 via the primary DNS service 80 using the domain name registration process and the EPP.

Additionally, in accordance with aspects of the present disclosure, the DNS registrant 20 and/or the service provider 40 can administer a domain name record 95 of the DNS registrant 20 recorded in the DNS registry system 60 via the secondary DNS interface service 90 without the need for support of the DNS registrar 30. For example, the secondary DNS interface service 90 can publish data from the DNS registry database 70 for use by the DNS registrant 20 and the service provider 40. Also, the secondary DNS interface service 90 can receive data from the DNS registrant 20 and the service provider 40 and initiate operations on their behalf. Further, the secondary DNS interface service 90 supports query operations. Moreover, the secondary DNS interface service 90 can confirm that the DNS registrant 20 and/or the service provider 40 have administrative control over a domain name of the DNS registrant 20 by verifying authorization tokens.

In embodiments, the secondary DNS interface service 90 provides a web interface (e.g., a representational state transfer (RESTful) interface) by which the DNS registrant 20 and/or the service provider 40 can access information stored in the DNS registry database 70 of the DNS registry system 60. For example, using the secondary DNS interface service 90, the DNS registry system 60 can share information stored in the DNS registry database 70 with the DNS registrant 20 and the service provider 40. As such, the DNS registrant 20 and the service provider 40 can access information that may be unavailable to them via the primary DNS interface service 80 without passing through the DNS registrar 30. Accordingly, the DNS registrant 20 and the service provider 40 can administer information associated with a domain name in the DNS registry system 60 by requesting actions that the DNS registrar 30 does not offer or that are not supported by the primary DNS interface service 80.

In accordance with some aspects of the present disclosure, the secondary DNS interface service 90 is entirely separate and independent of the primary registration service 80 used by the DNS registrar 30. For example, the secondary DNS interface service 90 can be a separate web interface, provided by separate hardware (e.g., servers), and/or using separate communication protocols (e.g., RDAP) than those used by the primary DNS interface service 80.

Additionally, in accordance with aspects of the present disclosure, the environment 10 includes the identity service 50, which identifies and authenticates interactions with the secondary DNS interface service 90. For example, the identity service 50 identifies, authenticates, and authorizes the DNS registrant 20 and/or the service provider 40 as part of validating their privileges for read and/or write access to the secondary DNS interface service 90. In embodiments, access to the secondary DNS interface service 90 is granted when the DNS registrant 20 or the service provider 40 sends a request to the secondary DNS interface service 90 that is accompanied by an authorization token. For example, the secondary DNS interface service 90 compares the received authorization token with another copy of the token obtained from a trusted third-party provider (e.g., the DNS registrar 30, the identity service 50, or the DNS registry system 60), and access to the secondary DNS interface service 90 is granted and a requested operation is performed if the authorization tokens are identical. Access is denied and the requested operation fails if the authorization tokens are not identical.

In some embodiments, the identity service 50 can be a federated authentication identity service that manages client credentials, authenticates client identity, and provides information needed to make registry authorization and access control decisions. In embodiments, the identity service 50 uses the OpenID Connect protocol, which can allow identity service 50 to verify the identity of entities (e.g., DNS registrant 20 and service provider 40). It also allows the secondary DNS interface service 90 to receive information about entities in an interoperable and RESTful manner. The entities are able to interact with the secondary DNS interface service 90 using OpenID credentials issued by a number of existing identity providers, so the DNS registry system 60 does not need to issue and maintain access credentials for every entity. Entity requests to access secondary DNS interface service 90 can be intercepted and authenticated, ensuring that access is granted only to authorized entities.

DNS registrants 20 can also use authorization information (e.g., tokens) to have actions performed on their behalf through the service provider 40 using the secondary DNS interface service 90. Authorization information can include either a single token to be used for all actions or multiple tokens to be associated with specific actions. Additionally, the DNS registrant 20 can provision authorization tokens for specific purposes to the DNS registry system 60 using a secondary DNS interface service 90 interface. Purpose-specific tokens can be retrieved by registrants who provide appropriate identification credentials and a master authorization token.

Beneficially, the authorization processes in accordance with aspects of the present disclosure allow the DNS registrant 20 to prove that they have administrative control over the domain name record 95. The authorization tokens can be used authorize specific operations requested by the DNS registrant 20 or the service provider 40 acting on behalf of the DNS registrant 20. These operations depend on a secondary DNS interface service 90 that is capable of performing both read and write data management operations.

The environment 10 shown in FIG. 1 is a simplified block diagram for the sake of illustration. For example, as illustrated the environment 10 includes a single DNS registrant 20, a single DNS registrar 30, and a single service provider 40. However, it is understood that environment 10 can include more than one of each of these entities. Additionally, FIG. 1 shows the identity service 50 is shown as a standalone service. However, in other embodiments, the identity service 50 is hosted by the DNS registry system 60. In other embodiments, the DNS registrar 30 hosts the identity service 50.

Figure 2:
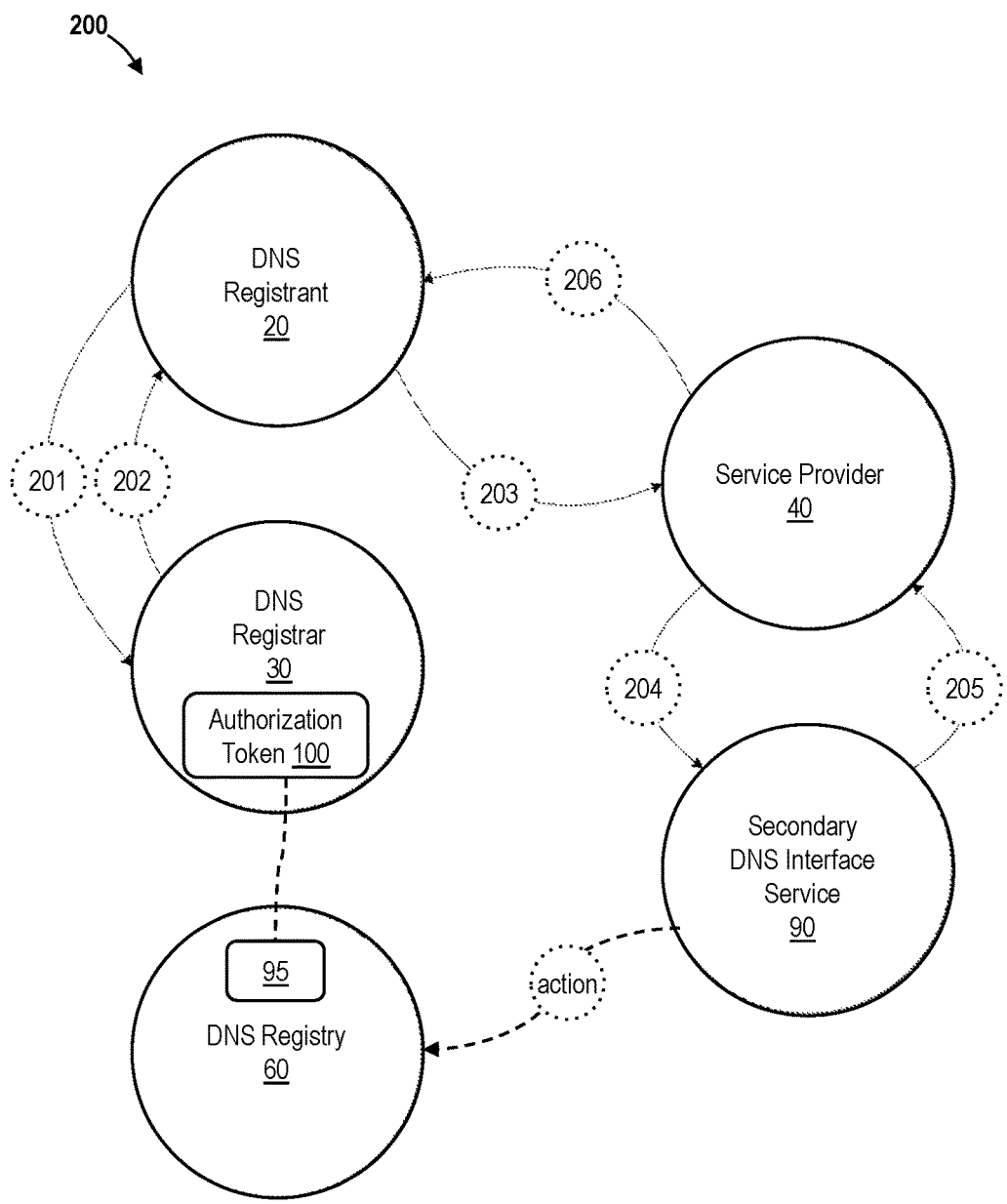
FIG. 2 illustrates a functional flow diagram of an example of a process in accordance with aspects of the present disclosure.

FIG. 2 illustrates a functional flow diagram of an example of a process 200 by which DNS registrant 20 and/or service provider 40 can update DNS registry system 60 via secondary DNS interface service 90. The functional flow diagram is accompanied in FIG. 2 by the dashed circles, which are numbered (201)-(206) to aid in clarity.

In accordance with aspects of the present disclosure, the DNS registrant 20 has a pre-established relationship with the DNS registrar 30 and the service provider 40. For example, the DNS registrant 20 may have previously used the DNS registrar 30 to obtain and register domain name record 95 with the DNS registry system 60, as previously described herein. Also, as previously described herein, the DNS registrant 20 may have previously engaged the service provider 40 to provide domain name resolution servers, identify authentication services, DNS Security Extensions (DNSSEC) key management services, and the like in association with the domain name record 95.

In accordance with aspects of the present disclosure the DNS registrant 20 has access to authorization token 100, which is specific to its domain name record 95 registered in the DNS registry 60. The domain specific authorization token 100 can be stored by an identity service (e.g., the identity service 50), which may be hosted by the DNS registrar 30. In some embodiments the authorization token 100 may be one of multiple limited-use tokens. For example, the tokens can be limited to use for a specific purpose and/or by a specific service provider 40 and/or a specific period of time (i.e., they may expire). These additional tokens may be stored at the DNS registrar 30 and made accessible through a service interface. In some embodiments the authorization token can be derived from a base token and input parameters. These parameters may include (but are not limited to) the authorization token, the identity of the service provider 40, the requested action, and the current time.

At (201) the DNS registrant 20 can send a request to the DNS registrar 30 for the authorization token 100. The DNS registrar 30 verifies the identity of the DNS registrant 20 based on, for example, a pre-established credential provided in association with the request. Additionally, the DNS registrar 30 can verify that the DNS registrant 20 is permitted to receive the authorization token 100 based on pre-established policies (e.g., time of request, location, or requestor, type of action associated with the request). If verified, at (202) the DNS registrar 30 returns the authorization token 100 to the DNS registrant 20. At (203) the DNS registrant 20 sends the authorization token 100 and an action request to the service provider 40. Examples of action requests include, but are not limited to, validation of the authorization token 100 (without necessarily any further action); addition of DNS records in the DNS registry 60; modification of DNS records; and modification of registrant contact information. An example where the secondary DNS interface service 90 performs only validation and not further action is when the service provider 40 is a certification authority and is validation the DNS registrant's 20 association with the domain prior to issuing a certificate to the DNS registrant 20.

At (204) the service provider 40 sends the action request and the authorization token 100 to the secondary DNS interface service 90 via, for example, a web interface of the secondary DNS interface service 90. The secondary DNS interface service 90 receives the related action request and the authorization token 100 (although not necessarily together). The secondary DNS interface service 90 checks the authorization token 100 for consistency with an expected value received from the identity service 50 (e.g., by direct comparison, or by comparing hash values). Alternatively, the secondary DNS interface service 90 may send the authorization token 100 to the identity service 50 for confirmation. The secondary DNS interface service 90 may also compare the service provider 40 identity and related action to a list of permissions associated with the token. If the authorization token 100 matches the expected value, the secondary DNS interface service 90 performs the requested action on the DNS registry 60. At (205) the secondary DNS interface service 90 returns a confirmation response to the service provider 40. At (206) the service provider 40 returns a confirmation response to the DNS registrant 20.

The process 200 enables a service provider 40 to interact with the secondary DNS interface service 90 on behalf of the DNS registrant 20. The flow of the process 200 conveys the DNS registrant's 20 authorization of the service provider 40's requests via the authorization token 100 obtained from the DNS registrar 30. However, it is understood that in some embodiments the service provider 40 may be excluded and the DNS registrant 20 can interact directly with the secondary DNS interface service 90 without the action request passing though the service provider 40.

Figure 3:
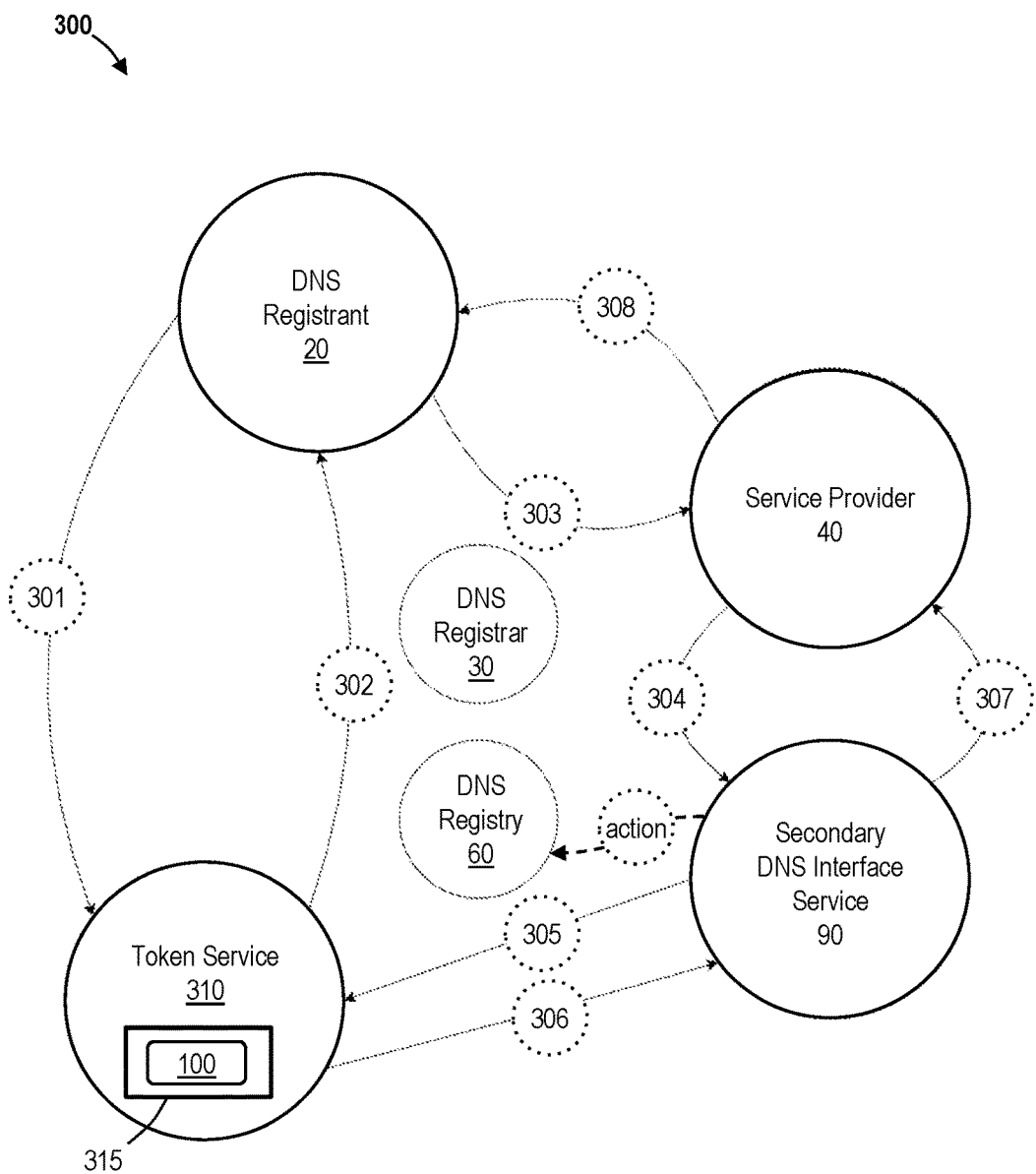
FIG. 3 illustrates a functional flow diagram of an example of a process in accordance with aspects of the present disclosure.

FIG. 3 illustrates a functional flow diagram of an example of a process 300 in accordance with aspects of the present disclosure, wherein a token service 310 provides a stand-alone identity service (e.g., identity service 50) that manages authorization tokens. The functional flow diagram is accompanied in FIG. 3 by the dashed circles, which are numbered (301)-(306) to aid in clarity.

In accordance with aspects of the present disclosure, the DNS registrant 20 has an account 315 at the token service 310 and has linked its domain in the DNS registry to the account 315. For example, the DNS registrant 20 may use an initial authorization token obtained from the DNS registrar 30 to demonstrate its authorization to link the domain to the account 315. Additionally, the token service 310 can have a pre-established relationship with the secondary DNS interface service 90.

At (301) the DNS registrant 20 requests authorization token 100 from the token service 310. At (302) the token service 310 returns the authorization token to the DNS registrant 20. At (303) the DNS registrant 20 sends an action request to the service provider 40 along with the authorization token 100, as described previously herein. At (304) the service provider 40 sends a related action request and the authorization token to the secondary DNS interface service 90.

At (305) the secondary DNS interface service 90 interacts with the token service 310 to validate the authorization token 100 and its authorization for the related action request (e.g., that the token is associated with a specific domain). The token service 310 receives the authorization token 100 and the related action information from the secondary DNS interface service 90 and checks it for consistency with an expected value. The token service 310 may also compare the service provider 40 identity and related action to a list of permissions and/or a set of policies associated with the authorization token 100.

At (306) the token service 310 returns a response to the secondary DNS interface service 90. The secondary DNS interface service 90 performs the related action if the token has been accepted by the token service 310. At (307) the secondary DNS interface service 90 returns a response to the service provider 40. At (308) the service provider 40 returns a response to the registrant and may perform an action itself. The service provider 40 can share the token with other service providers to authorize them also to interact with the secondary DNS interface service 90 on behalf of the DNS registrant 20, provided that they are also within the predefined scope of the authorization.

Advantageously, the token service 310 is independent of the DNS registrar 30. Hence, once the DNS registrant 20 has set up the account 315 and linked it to its domain (e.g., domain name record 95), the DNS registrant 20 can obtain additional authorization tokens without further interaction with the DNS registrar 30. In addition, the token service 310 does not need to interact with the DNS registry 60 to obtain the authorization token 100. This gives greater flexibility to the token service 315 for managing the authorization token 100, as well as interactions of the DNS registrant 20.

Figure 4:
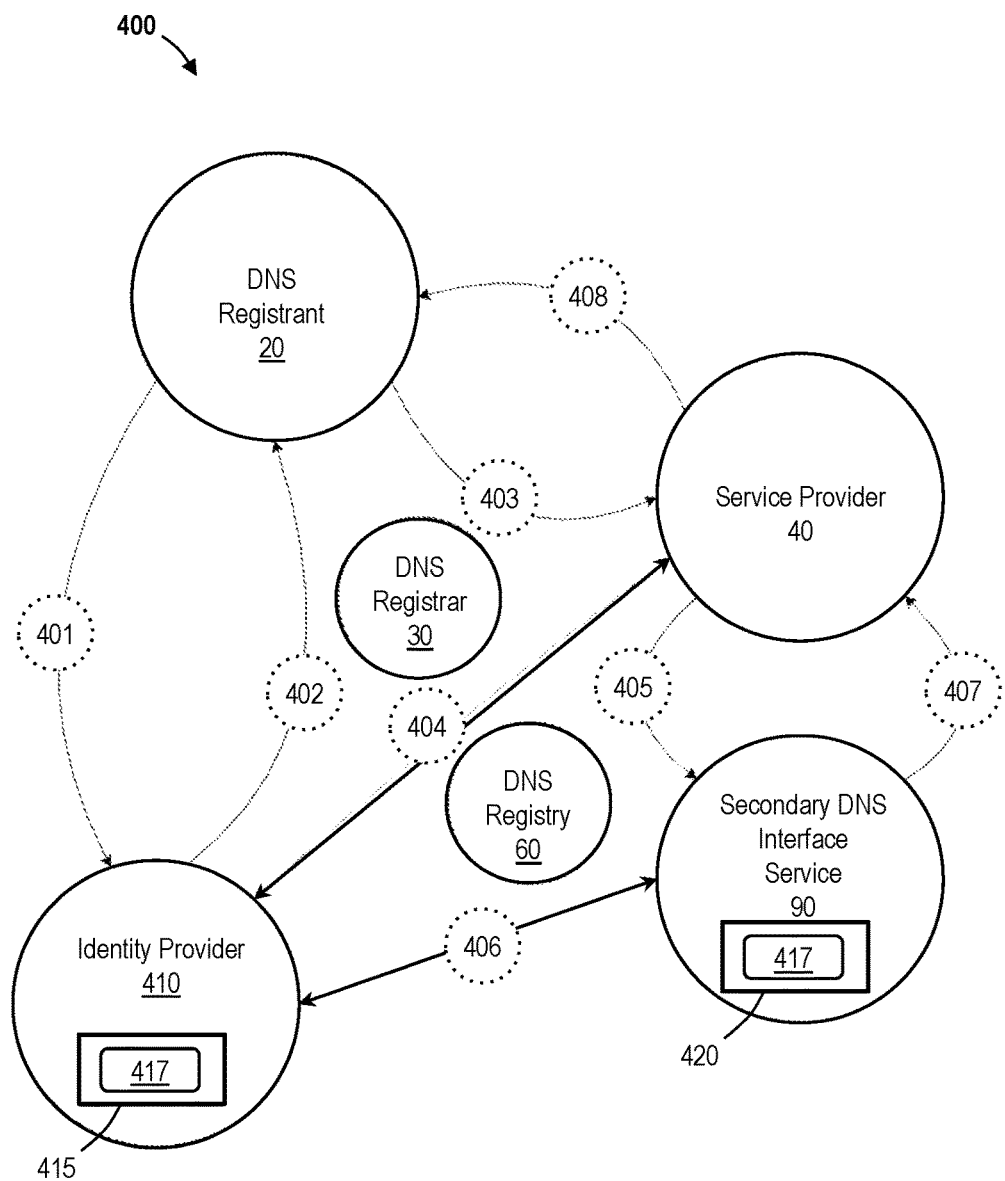
FIG. 4 illustrates a functional flow diagram of an example of a process in accordance with aspects of the present disclosure.

FIG. 4 illustrates a functional flow diagram of an example of a process 400 in accordance with aspects of the present disclosure, wherein an identity provider 410 (e.g., identity service 50) authenticates DNS registrant 20 and thereby enables the DNS registrant 20 to authorize actions requested by service provider 40. The functional flow diagram is accompanied in FIG. 4 by the dashed circles, which are numbered (401)-(408) to aid in clarity.

The identity of the DNS registrant 20 can be a form of contact information backed by the registrant's association with the identity provider 410, which can independently authenticate the DNS registrant 20 and its requests for actions or service in the DNS registry system 60.

In accordance with aspects of the present disclosure, the DNS registrant 20 has a pre-established account 415 with the identity provider 410 that establishes an identity 417. The DNS registrant 20 also has an account 420 at the secondary DNS interface service 90 based on the identity 417. The DNS registrant 20 has linked a domain name (e.g., domain name record 95) to the account 420 at the secondary DNS interface service 90. As discussed previously, this linkage may be achieved by presenting an initial authorization token obtained from the DNS registrar 30. In accordance with aspects of the present disclosure, the DNS registrant 20 has an account at the service provider 40 based on the same identity 417. Having the account 420 at the secondary DNS interface service 90 does not necessarily require that the secondary DNS interface service 90 maintain a persistent record of the account 420 itself. Instead, information of the account 420 could be stored elsewhere, e.g., at the identity provider 410, or at another service. When the DNS registrant 20 demonstrates to the secondary DNS interface service 90 or respectively to the service provider 40 that the DNS registrant 20 has successfully authenticated its identity 417 to the identity provider 410, the secondary DNS interface service 90 or the service provider 40 provides access to actions on the DNS registry system 60.

At (401) the DNS registrant 20 authenticates to the identity provider 410, indicating its intent to interact with the service provider 40 (and possibly to authorize an action). At (402) the identity provider 410 returns an authentication assertion confirming the successful authentication. In some embodiments, the DNS registrant 20 can begin by interacting with the service provider 40, and the service provider 40 can interact with the identity provider 410 on the DNS registrant's 20 behalf, or refer the DNS registrant 20 to the identity provider 410. At (403) the DNS registrant 20 sends an action request to the service provider 40 along with the authentication assertion. At (404) the service provider 40 verifies the authentication assertion. Depending on the type of authentication assertion, the service provider 40 may interact with the identity provider 410 as part of the verification process. At (405) the service provider 40 sends a related action request and the authentication assertion to the secondary DNS interface service 90. At (406) the secondary DNS interface service 90 verifies the authentication assertion, which may include interacting with the identity provider 410 to validate the service provider 40's authorization for the related action request (e.g., that the DNS registrant's 20 identity 417 is associated with a specific domain name record 95. At (407) the secondary DNS interface service 90 returns a response to the service provider 40. The related action is performed if the authentication assertion has been accepted. At (408) the service provider 40 returns a response to the DNS registrant 20.

The process 400 has the advantage that the DNS registrant 20 only interacts with the identity provider 410 and the service provider 40 in the normal flow. That is, the DNS registrant 20 does not need to interact with the secondary DNS interface service 90. The action of the service provider 40 action can nevertheless be limited to domains linked to the identity 417 of the DNS registrant in the account 420 at the secondary DNS interface service 90.

The storage of the same identity 417 at both the service provider 40 and the secondary DNS interface service 90 enables the authorization received by one to be validated by the other. In other embodiments, different identities and/or identity providers could be employed provided that there is a trustworthy way to associate them. Notably, the service provider 40, the secondary DNS interface service 90, the DNS registrar 40, and the DNS registry system 60 could also take the role of the identity provider 410. Also note that if the service provider 40 only wants to validate the association with a domain of the DNS registrant 20, the service provider 40 may not need the authorization of the DNS registrant 20 to do so. In particular, the identity 417 of the DNS registrant 20 may be available as public registration data, or otherwise accessible to service provider 40 without authorization. If so, the service provider 40 only needs to obtain the identity 417 of the DNS registrant 20 authoritatively from the secondary DNS interface service 90, and can then validate that a request is accompanied with an authentication assertion with the identity 417. The publication of the identity of the DNS registrant 20 in association with the domain could also in principle be accomplished as a DNS or DNS-based Authentication of Named Entities (DANE) record.

Figure 5:
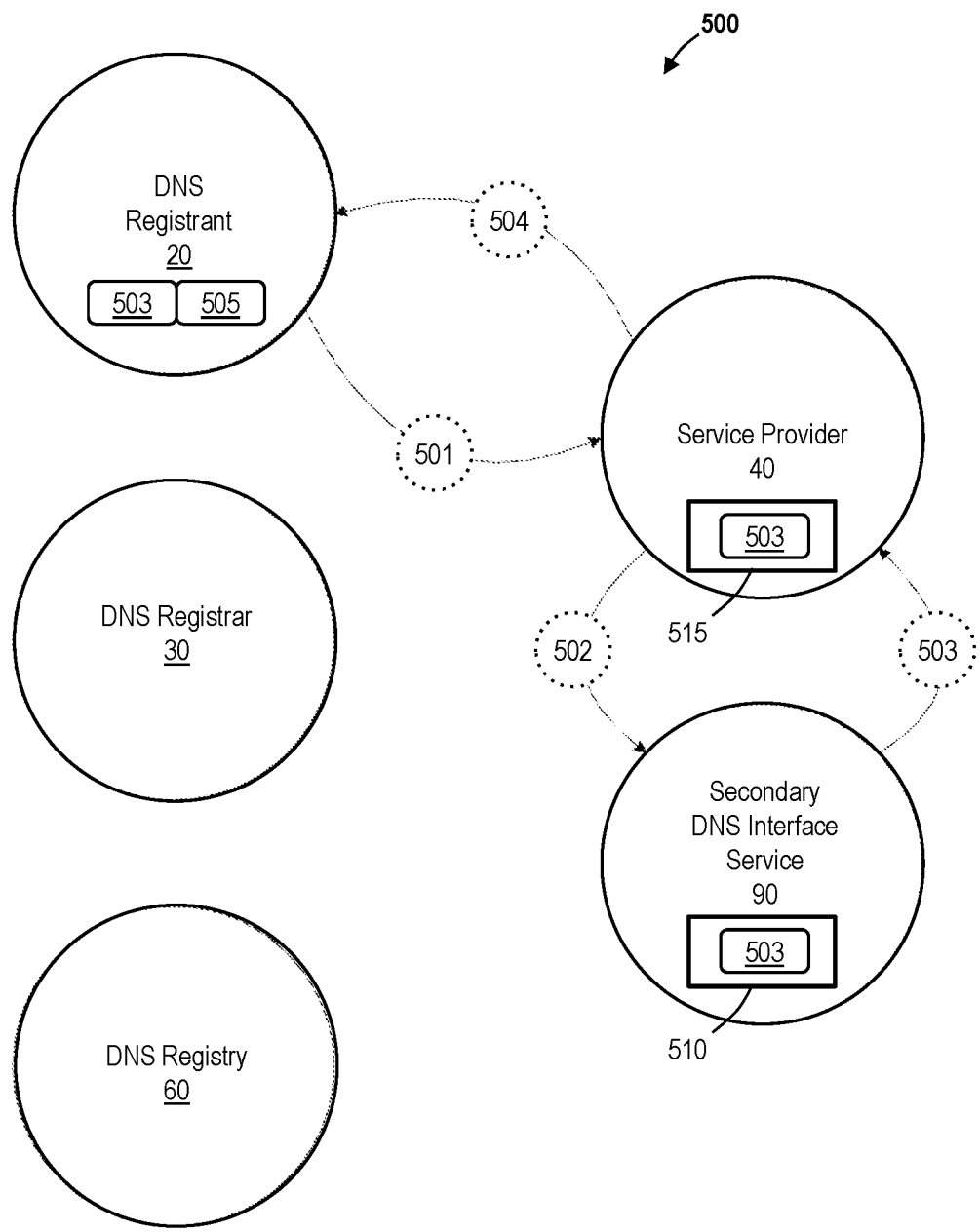
FIG. 5 illustrates a functional flow diagram of an example of a process in accordance with aspects of the present disclosure.

FIG. 5 illustrates a functional flow diagram of an example of a process 500 in accordance with aspects of the present disclosure, wherein the DNS registrant 20 links a public key 503 to its registered domain (e.g., domain name record 95) at the secondary DNS interface service 90. Based on the public key 503, the DNS registrant 20 can authorize the service provider 40 by digitally signing the authorization with the corresponding private key 505. The service provider 40 can convey the message and the secondary DNS interface service 90 can validate it with respect to the linked public key 503. The functional flow diagram is accompanied in FIG. 5 by the dashed circles, which are numbered (501)-(504) to aid in clarity.

In accordance with the present example, the DNS registrant 20 has an account 520 at the secondary DNS interface service 90, which the DNS registrant 20 has linked to its domain, as previously described herein. The DNS registrant 20 has a public/private key pair 503/505 and has linked the public key 503 or a related digital certificate to the account 520 and/or to this domain at the secondary DNS interface service 90. The secondary DNS interface service 90 may require proof of possession of the corresponding private key 505 to authenticate the linkage and/or proof of administrative control over the associated domain name record 95. The DNS registrant 20 also has account 515 at the service provider 40.

In accordance with the process 500, at (501) the DNS registrant 20 sends an action request to the service provider 40 along with a digital signature under the private key 505 of the DNS registrant 20 on a message authorizing the service provider 40 to operate on behalf of the DNS registrant 20. The registrant may also include a related digital certificate. The service provider 40 verifies the digital signature. At (502) the service provider 40 sends a related action request and the digitally signed authorization to the secondary DNS interface service 90. The secondary DNS interface service 90 verifies the digitally signed authorization using the previously linked public key 503 of the DNS registrant 20 to validate the service provider 40's authorization for the related action request. At (503) the secondary DNS interface service 90 returns a response to the service provider 40. The related action is performed if the authorization has been accepted. At (504) the service provider 40 returns a response to the DNS registrant 20 and may perform an action itself.

Advantageously, the process 500 does not involve an identity provider (e.g., Identity service 50) for authorization. However, in accordance with the present example, the DNS registrant 20 must maintain a public/private key pair 503/505. And, if the service provider 40 only wants to validate the association of the DNS registrant 20 with a domain, then the service provider 40 may not need the authorization of the DNS registrant 20 to do so. Here, the public key 503 of the DNS registrant 20 may be available as public registration data, or otherwise accessible to service provider 40 without authorization. If so, the service provider 40 only needs to obtain the public key 503 of the DNS registrant 20 authoritatively from the secondary DNS interface service 90, and can then validate the digital signature of the DNS registrant 20 on a related request. Note again that in this case the publication of the public key 503 of the DNS registrant 20 in association with the domain could be accomplished as a DNS or DANE record.

In accordance with aspects of process 500, the service provider 40 can authorize other service providers to perform actions on behalf of the DNS registrant 20 via digital signatures, following a similar approach. Here, the service provider 40 could link its public key 503 to the domain it is managing on behalf of the DNS registrant 20, so that the secondary DNS interface service 90 can validate authorization messages signed by the service provider 40. Alternatively, the service provider 40 could include its original authorization from the DNS registrant 20 in the message it signs authorizing another service provider 40 to act on its behalf. The other service provider 40 could then present both the original authorization and the second authorization to the secondary DNS interface service 90.

In the above examples, the secondary DNS interface service 90 determines that a service provider 40 is authorized to operate on the DNS registrant's 20 behalf by validating information presented by the service provider 40 that conveys the authorization of the DNS registrant 20. In the examples of FIGS. 2 and 3, the information is an authorization token. In the example of FIG. 4, the information is an assertion from an identity provider. And in the example of FIG. 5, it is the digital signature of the DNS registrant 20. This approach is convenient because it does not require the secondary DNS interface service 90 to keep track of which service provider 40s have been authorized by a particular DNS registrant. The secondary DNS interface service 90 determines authorization in the context of a service provider 40's request.

In accordance with aspects of the present disclosure, the service provider 40 may be selected from a list of service provider 40s maintained or otherwise obtained by the secondary DNS interface service 90. The secondary DNS interface service 90 thus takes the role of a "service catalog" where service provider 40s can indicate their capabilities and registrants can indicate their requirements. The secondary DNS interface service 90 can then "broker" relationships between the two. The secondary DNS interface service 90 can also broker such relationships between service providers. For example, a service provider 40 may want to bundle other services along with its service. When authorizing a service provider 40 to request operations on its behalf, the registrant could also specify that the service provider 40 may enlist other service provider 40s in the process.

As an example, suppose a user has an account on an e-commerce site, but does not yet have a domain name, and wants to register a domain name for use in a custom email addresses, so that her e-commerce site correspondence appears more "official." Suppose further that the e-commerce site is a reseller of domain names, but does not operate an email service. The e-commerce site may offer to register the custom domain name for the user, but would need to enlist an email service provider 40 to manage the email for the domain (which may involve updates to registration data). The e-commerce site could become authorized as part of registering the domain name for the registrant, which could be done by automating the workflow of the user, now in the role of a registrant, for registering the domain name, for setting up an account at the secondary DNS interface service 90, and for authorizing the e-commerce site to manage the domain on the user's behalf. The e-commerce site could then interact with the secondary DNS interface service 90, select an email service provider 40 for the domain, and authorize the email service provider 40 (on behalf of the user) to manage related registration data.

Figure 6:
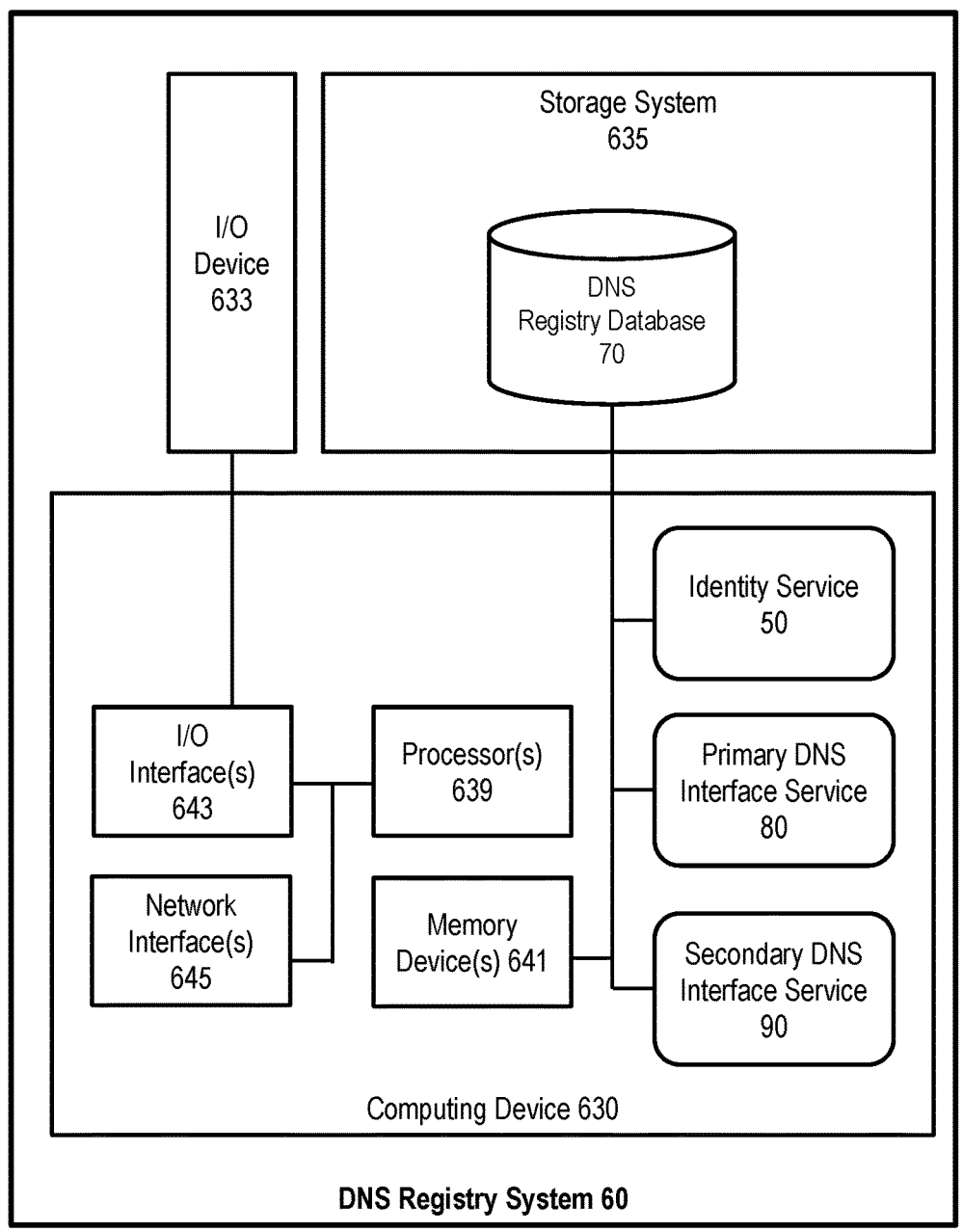
FIG. 6 illustrates a block diagram of an example of a system in accordance with aspects of the present disclosure.

FIG. 6 illustrates a system block diagram of a DNS registry system 60 in accordance with aspects of the present disclosure. The DNS registry system 60 can be the same or similar to that previously described. The DNS registry system 60 includes hardware and software that perform processes, services, and functions described herein. In particular, the DNS registry system 60 includes a computing device 630, an input/output (I/O) device 633, and a storage system 635. The I/O device 633 can include any device that enables an individual (e.g., an end user and/or consumer) to interact with the computing device 630 and/or any device that enables the computing device 630 to communicate with one or more other computing devices using any type of communications link. The I/O device 633 can include, for example, a touchscreen display, pointer device, keyboard, etc.

The storage system 635 can comprise a computer-readable, non-volatile hardware storage device that stores information and program instructions. For example, the storage system 635 can be one or more flash drives and/or hard disk drives. In accordance with aspects of the present disclosure, the storage system can include the DNS registry database 70, which can be the same or similar to that previously described herein.

In embodiments, the computing device 630 includes one or more processors 639 (e.g., microprocessor, microchip, or application-specific integrated circuit), one or more memory devices 641 (e.g., RAM and ROM), one or more I/O interfaces 643, and one or more network interfaces 644. The memory device 641 can include a local memory (e.g., a random access memory and a cache memory) employed during execution of program instructions. Additionally, the computing device 630 includes at least one communication channel (e.g., a data bus) by which it communicates with the I/O device 633, the storage system 635. The processor 639 executes computer program instructions (e.g., an operating system and/or application programs), which can be stored in the memory device 641 and/or storage system 635. Moreover, the processor 639 can execute computer program instructions of identity service 50, primary DNS interface service 80, and secondary DNS interface service 90, which may be the same or similar to those previously discussed herein.

Figure 7:
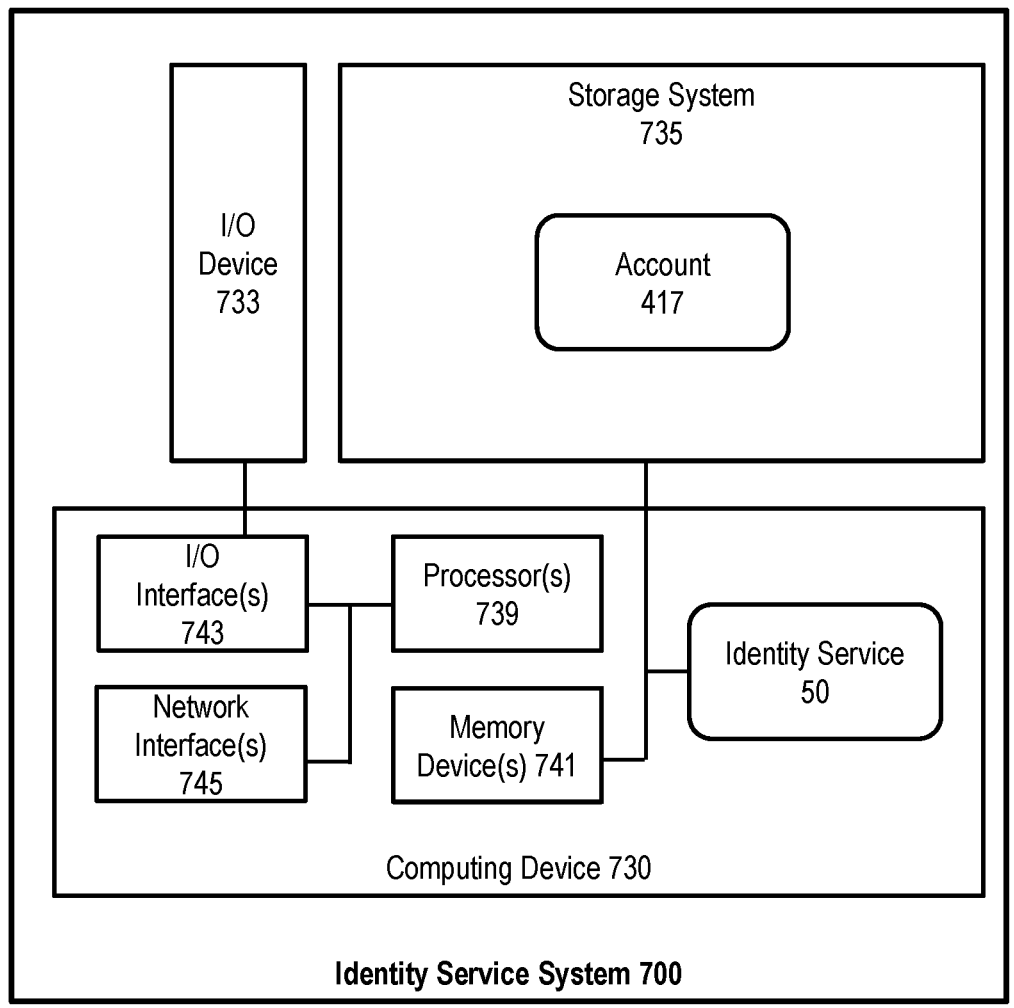
FIG. 7 illustrates a block diagram of an example of a system in accordance with aspects of the present disclosure.

FIG. 7 illustrates a system block diagram of an identity service system 700 in accordance with aspects of the present disclosure. The identity service system 700 can be the same or similar to that previously described. The identity service system 700 includes hardware and software that perform processes, services, and functions described herein. In particular, the identity service system 700 includes a computing device 730, an input/output (I/O) device 733, and a storage system 735. The I/O device 733 can include any device that enables an individual (e.g., an end user and/or consumer) to interact with the ICN server 15 (e.g., a user interface) and/or any device that enables the computing device 730 to communicate with one or more other computing devices using any type of communications link. The I/O device 733 can include, for example, a touchscreen display, pointer device, keyboard, etc.

The storage system 735 can comprise a computer-readable, non-volatile hardware storage device that stores information and program instructions. For example, the storage system 735 can be one or more flash drives and/or hard disk drives. In accordance with aspects of the present disclosure, the storage system can include information for an account 417, which can be the same or similar to that previously described herein.

In embodiments, the computing device 730 includes one or more processors 739 (e.g., microprocessor, microchip, or application-specific integrated circuit), one or more memory devices 741 (e.g., RAM and ROM), one or more I/O interfaces 743, and one or more network interfaces 744. The memory device 741 can include a local memory (e.g., a random access memory and a cache memory) employed during execution of program instructions. Additionally, the computing device 730 includes at least one communication channel (e.g., a data bus) by which it communicates with the I/O device 733, the storage system 735. The processor 739 executes computer program instructions (e.g., an operating system and/or application programs), which can be stored in the memory device 741 and/or storage system 735. Moreover, the processor 739 can execute computer program instructions of Identity service 50, which may be the same or similar to that previously discussed herein.

It is noted that in some embodiments the computing device 730 can comprise any general purpose computing article of manufacture capable of executing computer program instructions installed thereon (e.g., a personal computer, server, etc.). However, the computing device 730 is only representative of various possible equivalent-computing devices that can perform the processes described herein. To this extent, in embodiments, the functionality provided by the computing device 730 can be any combination of general and/or specific purpose hardware and/or computer program instructions. In each embodiment, the program instructions and hardware can be created using standard programming and engineering techniques, respectively.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 739), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units (e.g., memory device 741 or storage system 735) and executed by the processor. The memory unit can be implemented within the processor or external to the processor (e.g., processor 739), in which case it can be communicatively coupled to the processor via various means as is known in the art.

If implemented in software, the functions may be stored on or transmitted over a computer-readable medium as one or more instructions or code. Computer-readable media includes non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A method for updating a Domain Name System (DNS) registry comprising:
    maintaining a domain name record of a DNS registrant recorded in a database of the DNS registry by a DNS registrar using a primary DNS interface;
    receiving a request to update the domain name record of the DNS registrant via a secondary DNS interface at the DNS registry, wherein receiving the request to update the domain name record of the DNS registrant comprises receiving an authorization token of the DNS registrant and the authorization token is not received from the DNS registrar via the secondary DNS interface at the DNS registry; and
    modifying, without a need for support of the DNS registrar, the domain name record of the DNS registrant in the database of the DNS registry in accordance with the request.

2. The method of claim 1, wherein receiving the request to update the domain name record of the DNS registrant comprises receiving the request from the DNS registrant via the secondary DNS interface.

3. The method of claim 1, wherein receiving the request to update the domain name record of the DNS registrant comprises receiving the request from a service provider on behalf of the DNS registrant.

4. The method of claim 1, wherein the authorization token is obtained from the DNS registrar.

5. The method of claim 1, further comprising verifying, by the secondary DNS interface, the authorization token of the DNS registrant prior to modifying the domain name record of the DNS registrant.

6. The method of claim 5, wherein verifying the authorization token of the DNS registrant comprises verifying the authorization token with a standalone identity service.

7. The method of claim 5, wherein verifying the authorization token of the DNS registrant comprises verifying an authentication assertion with an identity provider that issued the authentication assertion to the DNS registrant.

8. The method of claim 5, wherein verifying the authorization token of the DNS registrant comprises verifying the authorization token with public key of the registrant corresponding to a private key that was used to generate the authorization token for the registrant.

9. A method comprising:
    receiving, by primary interface service at a Domain Name System (DNS) registry, from a DNS registrar, a domain name of a DNS;
    receiving, by a secondary DNS interface service at the DNS registry, from a service provider, an authorization token of the DNS registrant and a request to update information associated with the domain name of the DNS registrant, wherein the authorization token is not received from the DNS registrar at the secondary DNS interface service at the DNS registry;
    verifying the authorization token using an identity service; and modifying, without a need for support of the DNS registrar, information associated with the domain name of the DNS registrant in accordance with the request.

10. A system for updating a Domain Name System (DNS) registry, the system comprising:
  an identity service configured to authenticate an authorization token received via a secondary DNS interface to the DNS registry database;
  a DNS registry database;
  a primary DNS interface to the DNS registry database;
  a processor;
  a data storage device; and
  program instructions stored on the data storage device that, when executed by the processor, cause the system to perform operations comprising:
    maintaining a domain name record of a DNS registrant recorded in the DNS registry database by a DNS registrar using the primary DNS interface;
    receiving a request from a service provider on behalf of the DNS registrant to update the domain name record of the DNS registrant via the secondary DNS interface; and
    after authentication by the identity service, modifying, without a need for support of the DNS registrar, the domain name record of the DNS registrant in the DNS registry database in accordance with the request.

11. The system of claim 10, wherein receiving the request to update the domain name record of the DNS registrant comprises receiving the request from the DNS registrant via the secondary DNS interface.

12. The system of claim 10, wherein receiving the request to update the domain name record of the DNS registrant comprises receiving the authorization token.

13. The system of claim 12, wherein the authorization token is obtained from the DNS registrar.

14. The system of claim 12, wherein the operations further comprise verifying, by the secondary DNS interface, the authorization token of the DNS registrant prior to modifying the domain name record of the DNS registrant.

15. The system of claim 14, wherein the identity service is a standalone identity service, and wherein verifying the authorization token of the DNS registrant comprises verifying the authorization token with the standalone identity service.

16. The system of claim 14, wherein verifying the authorization token of the DNS registrant comprises verifying an authentication assertion with an identity provider that issued the authentication assertion to the DNS registrant.

17. The system of claim 14, wherein verifying the authorization token of the DNS registrant comprises verifying the authorization token with public key of the registrant corresponding to a private key that was used to generate the authorization token for the registrant.

* * * * *